(12) United States Patent
Egawa et al.

(10) Patent No.: US 10,487,546 B2
(45) Date of Patent: Nov. 26, 2019

(54) DOOR LOCKING DEVICE FOR VEHICLE

(71) Applicant: KABUSHIKI KAISHA TOKAI RIKA DENKI SEISAKUSHO, Aichi (JP)

(72) Inventors: Tetsuya Egawa, Aichi (JP); Toru Maeda, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 8 days.

(21) Appl. No.: 16/067,949

(22) PCT Filed: Jan. 18, 2017

(86) PCT No.: PCT/JP2017/001451
§ 371 (c)(1),
(2) Date: Jul. 3, 2018

(87) PCT Pub. No.: WO2017/126515
PCT Pub. Date: Jul. 27, 2017

(65) Prior Publication Data
US 2019/0316387 A1    Oct. 17, 2019

(30) Foreign Application Priority Data
Jan. 19, 2016  (JP) ................ 2016-007981

(51) Int. Cl.
*E05B 77/36*   (2014.01)
*E05B 77/48*   (2014.01)
(Continued)

(52) U.S. Cl.
CPC ............. *E05B 77/36* (2013.01); *E05B 77/48* (2013.01); *E05B 77/54* (2013.01); *E05B 81/72* (2013.01); *G07C 9/00309* (2013.01)

(58) Field of Classification Search
CPC ...... E05B 77/36; E05B 77/48; G07C 9/00309
(Continued)

(56) References Cited

U.S. PATENT DOCUMENTS 6,552,649 B1   4/2003  Okada et al.
9,378,603 B2   6/2016  Seino
(Continued)

FOREIGN PATENT DOCUMENTS

JP   2000-73635    3/2000
JP   2007-278731   10/2007
(Continued)

OTHER PUBLICATIONS

International Search Report in International Patent Application No. PCT/JP2017/001451, dated Mar. 21, 2017.

*Primary Examiner* — Vernal U Brown
(74) *Attorney, Agent, or Firm* — Greenblum & Bernstein, P.L.C.

(57) ABSTRACT

This door locking device for a vehicle includes: an electronic key and an in-vehicle device. The electronic key stores a first threshold defining an extension of a first region in which an electric field intensity of a response request signal is strong and a second threshold for defining an extension of a second region in which an electric field intensity is weaker than the first region around the first region. The electronic key outputs, based on the electric field intensity of the response request signal and the first and second thresholds, a response signal including position information indicating whether the electronic key is in the first region, or is outside the first region but in the second region, or is outside the second region. Based on the received response signal, the in-vehicle device switches the door to an unlocked state or a locked state.

5 Claims, 3 Drawing Sheets

(51) Int. Cl.
*G07C 9/00* (2006.01)
*E05B 81/72* (2014.01)
*E05B 77/54* (2014.01)

(58) Field of Classification Search
USPC ...................................................... 340/5.72
See application file for complete search history.

(56) References Cited

U.S. PATENT DOCUMENTS

2017/0151928 A1* 6/2017 Kang ...................... B60R 25/04
2018/0276926 A1* 9/2018 Hayashi ................ B60R 25/245
2018/0370487 A1* 12/2018 Ishikawa ................ B60R 25/24

FOREIGN PATENT DOCUMENTS

JP 2012-67463 4/2012
JP 2015-101908 6/2015

* cited by examiner

DOOR LOCKING DEVICE FOR VEHICLE

TECHNICAL FIELD

The present invention relates to a vehicle door lock device.

BACKGROUND ART

A known vehicle door lock device controls a door lock by performing bidirectional wireless communication between a vehicle and a mobile electronic key. The vehicle door lock device is configured to automatically unlock a door of the vehicle if a person carrying an authenticated electronic key (hereinafter may be referred to as the electronic key carrier) approaches the vehicle and automatically lock the door if the electronic key carrier leaves the vehicle.

Such a vehicle door lock device includes an onboard controller installed in the vehicle and an electronic key. For example, if the electronic key receives a low frequency (LF) band response request signal transmitted from the vicinity of the door of the vehicle or from an LF transmitter placed in proximity to a trunk lid at a rear portion of the vehicle, the electronic key transmits an ultrahigh frequency (UHF) band response signal. The onboard controller unlocks the door if the response signal is received from the electronic key and keeps the door locked if the response signal cannot be received.

Patent document 1 discloses a keyless entry system similar to the above vehicle door lock device.

PRIOR ART DOCUMENT

Patent Document

Patent Document 1: Japanese Laid-Open Patent Publication No. 2015-101908

SUMMARY OF THE INVENTION

In the conventional vehicle door lock device, the door is unlocked if the electronic key receives the response request signal and transmits the response signal, and the door is kept locked if the electronic key does not receive the response request signal. For example, if the electronic key carrier passes by the vicinity of the door outside the vehicle, the electronic key is moved from the outside of a response request signal receivable region to the inside of the receivable region and then further moved from the inside of the receivable region to the outside of the receivable region. In this case, the door switches from the lock state to an unlock state and then returns from the unlock state to the lock state without the door being opened. Thus, an operation noise of the door lock is repeatedly produced if the door switches between the lock state and the unlock state. The operation noise is annoying to the electronic key carrier. Further, unnecessary operations of the door lock that are not intended by the electronic key carrier consume unnecessary power.

In the same manner, if the electronic key carrier puts luggage into the trunk and returns to the driver seat, the electronic key may be moved from a receivable region proximate to the trunk to the outside of the receivable region and then further moved to the inside of a receivable region proximate to the drive seat. This also repeatedly produces an unnecessary operation noise of the door lock.

It is an object of the present invention to provide a vehicle door lock device that prevents unnecessary switching of a door between a lock state and an unlock state when an electronic key carrier moves near a vehicle.

A vehicle door lock device according to one aspect of the present invention includes a door lock configured to switch a door of a vehicle between a lock state and an unlock state, an electronic key that transmits a response signal upon receipt of a response request signal, and an onboard device installed in the vehicle. The onboard device transmits the response request signal out of the vehicle and drives the door lock upon receipt of the response signal. The electronic key includes a threshold value setting unit that stores a first threshold value setting a periphery of a first region generated by the response request signal and having a strong electric field strength and a second threshold value setting a periphery of a second region around the first region and having a weaker electric field strength than the first region. The electronic key controller further includes a response signal generation unit that outputs the response signal including position information indicating whether the electronic key is located in the first region, outside the first region and in the second region, or outside the second region based on an electric field strength detected by the electronic key and the first threshold value and the second threshold value. The onboard device includes an onboard controller that, upon receipt of the response signal, switches the door to the unlock state if the electronic key is remaining in the first region for a first fixed time length or longer and switches the door to the lock state if the electronic key is remaining outside the second region for a second fixed time length or longer.

With this configuration, the door is switched to the unlock state if the electronic key is remaining in the first region over the first fixed time length or longer, and the door is switched to the lock state if the electronic key is remaining outside the second region over the second fixed time length or longer.

It is preferred that the vehicle door lock device include a position sensor that detects a position of the electronic key and movement information including movement speed and movement direction of the electronic key. Further, it is preferred that the response signal generation unit be configured to output the movement information by including the movement information in the response signal. In addition, it is preferred that the onboard controller be configured to switch the door to the unlock state, based on the movement information, if the electronic key is remaining still in the first region over the first fixed time length or longer.

With this configuration, if the electronic key is remaining still in the first region over the first fixed time length or longer, the door is switched to the unlock state. For example, if the electronic key is not remaining in the first region over the first fixed time length or longer or if the electronic key is not remaining still in the first region, the door is not unlocked.

It is preferred that when the electronic key is moved from the second region to outside the second region, the onboard controller be configured to switch the door to the lock state, based on the movement information, only if the electronic key is moved away from the vehicle.

With this configuration, when the electronic key is moved from the second region to the outside of the second region, the door is switched to the locked state only if the electronic key is leaving the vehicle.

It is preferred that the onboard controller be configured to keep the door unlocked, based on the movement information, if the electronic key is moved from the first region to the second region and then to the first region.

With this configuration, when the electronic key is moved from the first region through the second region to the first region, the door is kept unlocked.

It is preferred that the onboard device include a plurality of transmitters placed in proximity to the door of the vehicle and in proximity to a trunk lid to transmit the response request signal. Further, it is preferred that the first threshold value and the second threshold value be set so that the first region extends around each of the transmitters and the second region extends around the first regions and rearward from a side of the vehicle.

With this configuration, the second region surrounds the side and rear of the vehicle, preferably surrounds the vehicle seamlessly. Thus, the position and/or movement of the electronic key at the side and rear of the vehicle are detected.

A vehicle door lock device according to several aspects of the present invention reduces or prevents unnecessary switching of a door between a lock state and an unlock state when an electronic key carrier moves near a vehicle. Other embodiments and advantages of the present invention are understood from the following description together with the drawings that illustrate the examples of technical ideas of the present invention.

EMBODIMENTS OF THE INVENTION

Figure 1:
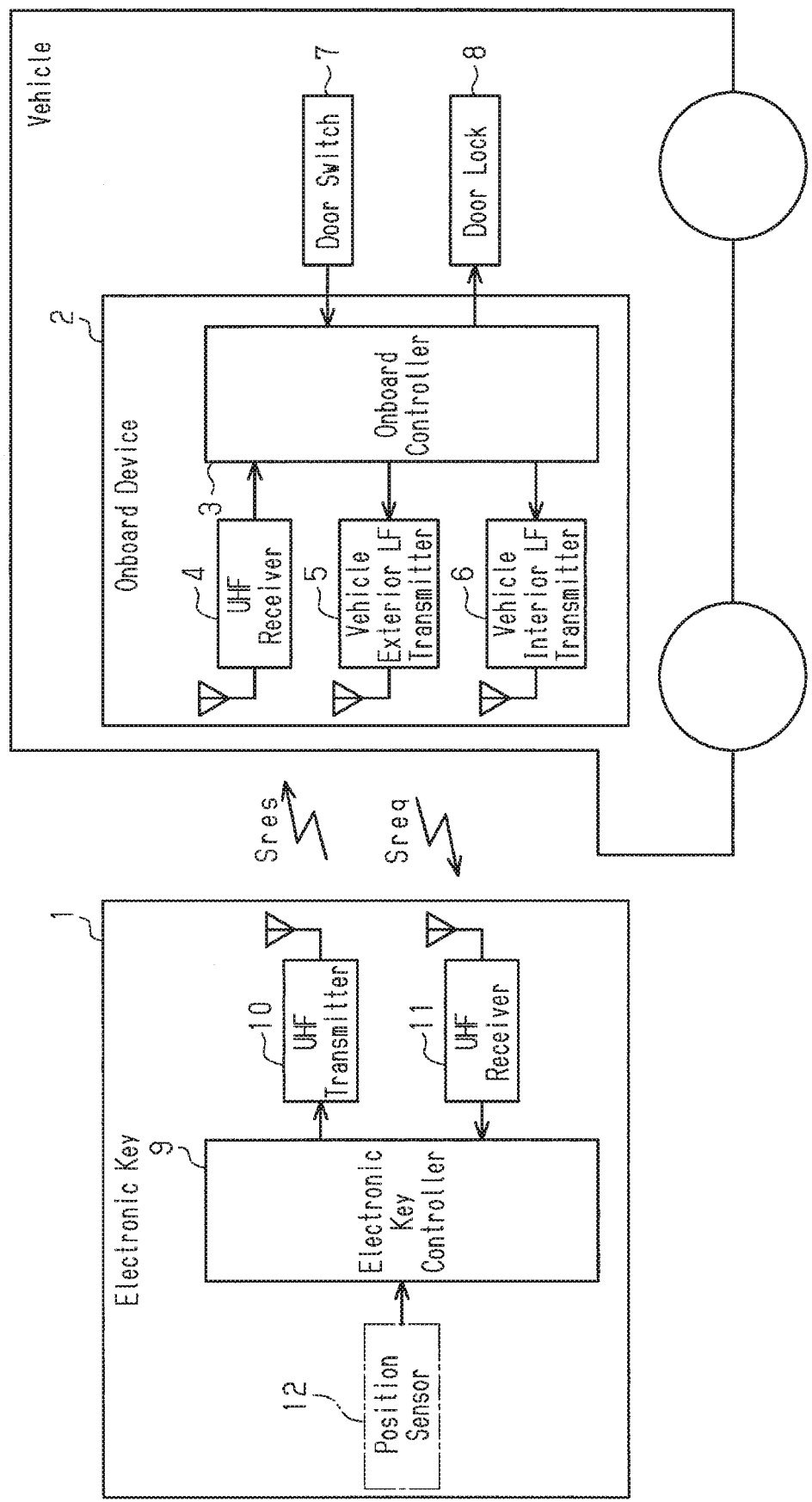
FIG. 1 is a block diagram of a vehicle door lock device.

One embodiment of a vehicle door lock device will now be described with reference to the drawings. As shown in FIG. 1, the vehicle door lock device includes an electronic key 1 carried by an electronic key carrier, who may be a vehicle occupant of the vehicle, and an onboard device 2 installed in the vehicle. The electronic key 1 may be referred to as the electronic key registered in advance to the onboard device 2 or the authorized electronic key.

The onboard device 2 includes an onboard controller 3, an UHF receiver 4, a vehicle exterior LF transmitter 5, and a vehicle interior LF transmitter 6.

Figure 2:
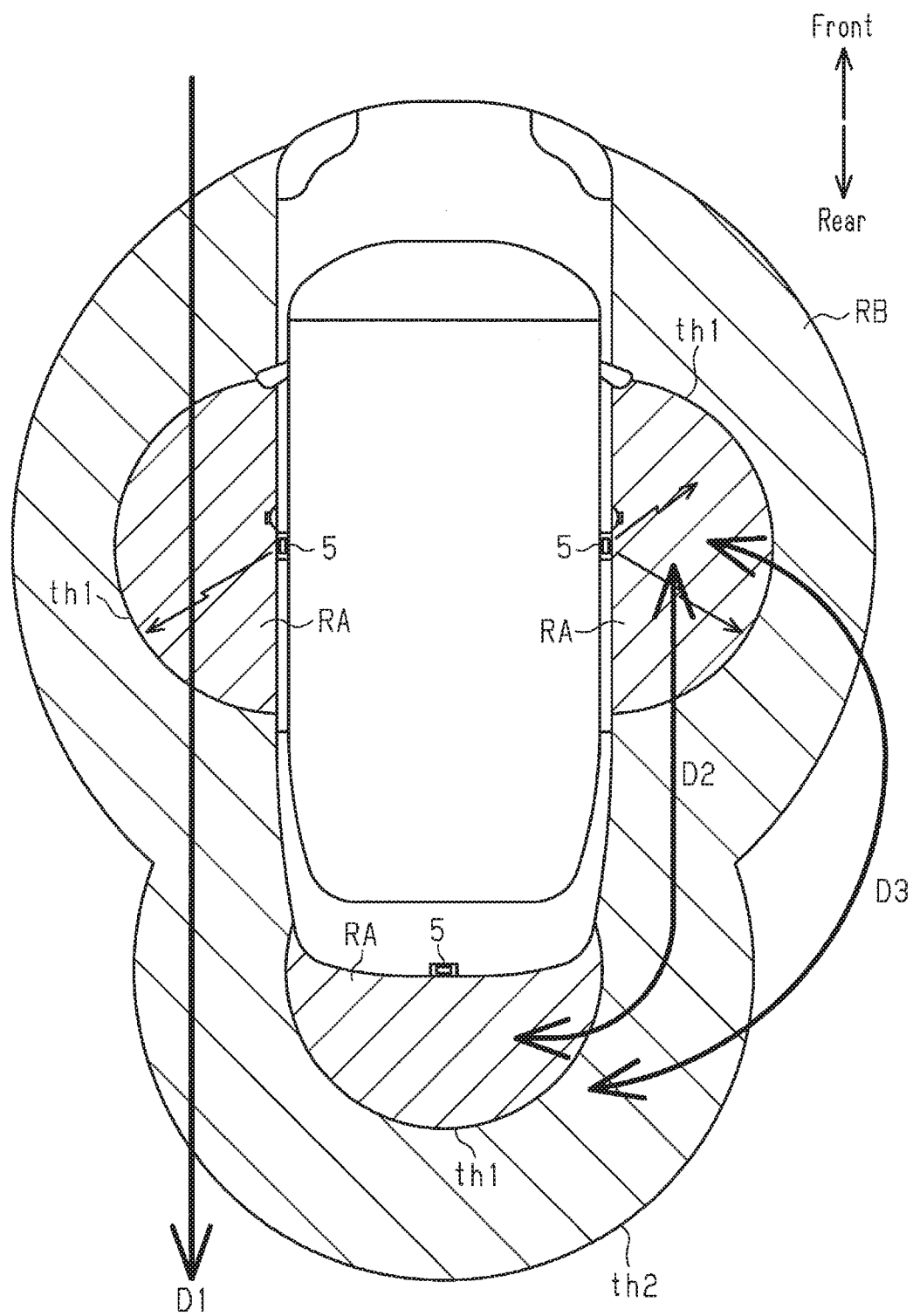
FIG. 2 is a schematic diagram illustrating a first region and a second region of a response request signal.

The UHF receiver 4 receives an UHF band response signal Sres transmitted from the electronic key 1 and outputs the response signal Sres to the onboard controller 3. The vehicle exterior LF transmitter 5 transmits, to the outside of the vehicle, a response request signal Sreq provided from the onboard controller 3. The response request signal Sreq may be referred to as the LF signal. FIG. 2 shows a plurality of vehicle exterior LF transmitters 5 placed on right and left center pillars and on a trunk lid of the vehicle. The vehicle interior LF transmitter 6 is placed in the passenger compartment and transmits the response request signal Sreq, which is provided from the onboard controller 3, to the inside of the vehicle.

A door switch 7 is directly or indirectly connected to the onboard controller 3. Further, a door lock 8 is directly or indirectly connected to the onboard controller 3. If the onboard controller 3 receives an operation signal from the door switch 7 or if the onboard controller 3 receives the response signal Sres from the electronic key 1, the onboard controller 3 controls the door lock 8 to lock or unlock the door. The configuration of the door lock 8 is not particularly limited as long as the door is switched between a lock state and an unlock state. The door lock 8 according to several implementations may include an electric motor that moves a lock bar.

The electronic key 1 includes an electronic key controller 9, a UHF transmitter 10, an LF receiver 11, and a position sensor 12. The LF receiver 11 receives the response request signal Sreq, which is transmitted from the vehicle exterior LF transmitter 5, and outputs the response request signal Sreq to the electronic key controller 9.

The position sensor 12 detects the position of the electronic key 1 and the movement speed and movement direction of the electronic key 1 from changes in the position of the electronic key 1 and outputs a detection signal to the electronic key controller 9. In several implementations, the position of the electronic key 1 may be the position of the electronic key 1 using the vehicle exterior LF transmitter 5 (or door) as a reference. In other implementations, the position of the electronic key 1 may be the distance from the vehicle exterior LF transmitter 5 (or door) to the electronic key 1.

The LF receiver 11 detects an electric field strength of a received LF signal and outputs, to the electronic key controller 9, a received signal strength detection signal indicating the detected electric field strength.

The electronic key controller 9 is provided with at least two predetermined threshold values th1 and th2 used to determine the region outside the vehicle in which the electronic key 1 is located from the received signal strength detection signal of the LF receiver 11. The second threshold value th2 is smaller than the first threshold value th1. The first threshold value th1 corresponds to a first strength of the response request signal Sreq received by the electronic key 1, and the second threshold value th2 corresponds to a second strength of the response request signal Sreq received by the electronic key 1.

For example, as shown in FIG. 2, if the electric field strength of the response request signal Sreq, which is the LF signal transmitted from the vehicle exterior LF transmitter 5 and received by the electronic key 1, is larger than the first threshold value th1, the electronic key controller 9 determines that the electronic key 1 is located in a first region RA. If the electric field strength of the received response request signal Sreq is less than the first threshold value th1 and greater than the second threshold value th2, the electronic key controller 9 determines that the electronic key 1 is located in a second region RB outside the first region RA. If the electric field strength is smaller than the second threshold value th2, the electronic key controller 9 determines that the electronic key 1 is located outside the second region RB.

The first region RA is a region where the electric field strength is the strongest in the vicinity of each vehicle exterior LF transmitter 5. The second region RB is a region outside the first region RA and extends rearward from the side of the vehicle. The second region RB is a region where the electric strength field is weaker than the first region RA. The region outside the second region RB is a region where the electric strength field is further weaker than the second region RB and may be referred to as the third region.

The electronic key controller 9 generates the response signal Sres based on the response request signal Sreq received by the LF receiver 11 and outputs the response signal Sres to the UHF transmitter 10. The UHF transmitter 10 transmits the response signal Sres as the UHF signal. The response signal Sres is received by the UHF receiver 4, which is installed in the vehicle.

The response signal Sres generated by the electronic key controller 9 includes ID information set to the electronic key 1, movement information indicating whether the electronic key 1 is located in the first region RA, outside the first region RA in the second region RB, or outside the second region RB, and movement information indicating the movement speed and the movement direction of the electronic key 1.

The onboard controller 3 outputs a control signal to the door lock 8 based on the response signal Sres received by the UHF receiver 4. The door lock 8 locks and unlocks the door based on the control signal from the onboard controller 3.

The operation of the vehicle door lock device will now be described with reference to FIG. 3.

If the onboard controller 3 cannot determine that the electronic key 1 is located in the vehicle, the onboard controller 3 periodically outputs the response request signal Sreq from the vehicle exterior LF transmitter 5 to the outside of the vehicle, for example, at a controlled timing. If the onboard controller 3 cannot receive the response signal Sres corresponding to the response request signal Sreq from the electronic key 1, that is, if the electronic key 1 cannot receive the response request signal Sreq (step S1: NO), the onboard controller 3 locks the door (step S2) and waits for the electronic key 1 to move into the first region RA or the second region RB.

If the electronic key carrier approaches the vehicle and the electronic key 1 moves into the second region RB, the electronic key 1 transmits the response signal Sres. If receiving the response signal Sres, the onboard controller 3 determines whether or not the electronic key 1 is remaining in the first region RA for a first fixed time length or longer (step S3).

If the electronic key 1 is not remaining in the first region RA over the first fixed time length or longer (for example, two to three seconds or longer) and moves out of the first region RA (step S3: NO), the onboard controller 3 keeps the door locked (step S2) and returns to step S1.

In step S3, if the electronic key 1 is remaining in the first region RA over the first fixed time length or longer (step S3: YES), the onboard controller 3 detects the movement speed of the electronic key 1 (or electronic key carrier) from the response signal Sres.

In step S4, if the electronic key carrier is moving, the onboard controller 3 keeps the door locked (step S2) and returns to S1. In step S4, if the electronic key carrier is not moving, the onboard controller 3 unlocks the door (step S5) and keeps the door unlocked until the electronic key carrier moves (steps S5 and S6).

If the electronic key carrier traverses the first and second regions RA and RB along path D1 shown in FIG. 2, the electronic key 1 enters the first region RA. However, in this case, in step S3, the electronic key 1 is not remaining in the first region RA over the first fixed time length and the movement speed of the electronic key 1 is not zero. Thus, the above operation keeps the door locked.

Further, if the electronic key carrier starts moving in a state in which the door is kept unlocked in step S5 (step S6: NO) and the electronic key carrier moves from the first region RA to the second region RB and then to the first region RA without moving out of the second region RB (step S7: YES), the onboard controller 3 keeps the door unlocked (step S5).

Such an operation keeps the door unlocked if, for example, as shown by path D2 in FIG. 2, the electronic key carrier moves from the first region RA in the proximity of the trunk lid to the second region RB and then to the first region RA in the proximity of the driver seat without moving out of the second region RB.

If the electronic key carrier moves from the first region RA to the second region RB and then out of the second region RB (step S7: NO, step S8: YES), the onboard controller 3 determines in step S9 whether or not the electronic key carrier is leaving the vehicle. In step S9, if the electronic key carrier is not leaving the vehicle and is moving in parallel to the vehicle or approaching the vehicle, the onboard controller 3 determines whether or not the electronic key carrier is remaining outside the second region RB for a predetermined second fixed time length or longer (step S10).

If the electronic key carrier moves from the outside of the second region RB to the inside of the first region RA or the inside of the second region RB without remaining outside the second region RB over the predetermined second fixed time length or longer (step S10: NO), the onboard controller 3 keeps the door unlocked (step S11) and returns to step S1. In the present embodiment, the second fixed time length is equal to the first fixed time length. However, the second fixed time length may be longer than or shorter than the first fixed time length.

If the electronic key carrier leaves the vehicle in step S9, the onboard controller 3 switches the door to the lock state (step S12) and returns to step S1. In the same manner, if the electronic key carrier is remaining outside the second region RB over the second fixed time length or longer in step S10, the onboard controller 3 switches the door to the lock state (step S12) and returns to step S1.

Such an operation keeps the door unlocked if, as shown by path D3 in FIG. 2, for example, the electronic key carrier moves from the first region RA in the proximity of the trunk lid through the second region RB and then out of the second region RB before moving into the first region RA or the second region RB within the second fixed time length.

If the onboard controller 3 can expect that the electronic key 1 will approach the vehicle again (for example, U-turn indicated by path D3 in FIG. 2) from the changing tendency of the movement direction of the electronic key 1 outside the second region RB based on the movement information included in the response signal Sres, the onboard controller 3 also determines that the electronic key carrier is not leaving the vehicle (step S9: YES NO). This also keeps the door unlocked.

The above vehicle door lock device has the advantages described below.

(1) If the electronic key carrier is remaining still in the first region RA over the first fixed time length or longer, the door is switched to the unlock state.

(2) If the electronic key carrier moves away to a position where the respond request signal Sreq cannot be received, the door is switched to the lock state.

(3) When the door is locked, the door is not switched to the unlock state even if the electronic key carrier traverses the second region RB and the first region RA from outside the second region Rb and then moves out of the second region RB without becoming still. Thus, unnecessary operations of the door lock 8 are reduced or prevented. This reduces the power consumption that would result from unnecessary operations of the door lock 8 and decreases the frequency the operation noise of the door lock 8 is produced.

(4) If the door is unlocked and the electronic key carrier moves from the first region RA to the second region RB and then to the first region RA, the door is not switched to the lock state. This reduces or prevents unnecessary operations of the door lock.

(5) If the door is unlocked and the electronic key carrier moves from the first region RA to the second region RB and then out of the second region RB, as long as the electronic key carrier does not leave the vehicle, the door is not switched to the lock state. Further, if the electronic key carrier is not remaining outside the second region RB over the second fixed time length or longer and moves into the second region RB, the door is kept unlocked. This reduces or prevents unnecessary operations of the door lock 8.

(6) When the door is locked, the door is switched to the unlock state only if the electronic key carrier is remaining in the first region RA over the first fixed time length or longer. Further, when the door is unlocked, if the second fixed time length or longer elapses from when the electronic key carrier moves out of the second region RB or the electronic key carrier leaves the vehicle, the door is switched to the lock state. Thus, since the first threshold value th1 used to switch the door from the lock state to the unlock state differs from the second threshold value th2 used to switch the door from the unlock state to the lock state, unnecessary enlargement of the first region RA that switches the door from the lock state to the unlock state is reduced or prevented.

(7) The second threshold value th2, which is one of the conditions for switching the door from the unlock state to the lock state, is smaller than the first threshold value th1. The second region RB surrounds the first region RA and is larger than the first region RA. Thus, if the door is unlocked, the region that keeps the door unlocked can be enlarged to reduce or prevent unnecessary operations of the door lock 8.

The electronic key controller 9 is a computer functioning as a threshold value setting unit and a response signal generation unit or can include such a computer. The computer can include one or more processors and one or more memories. The one or more memories may function as the threshold value setting unit storing the first threshold value th1 that sets the periphery of the first region RA generated by the response request signal Sreq and having a strong electric field strength and a second threshold value th2 that sets the periphery of the second region RB around the first region RA and has a weaker electric field strength than the first region RA. The one or more processors of the electronic key controller 9 may function as the response signal generation unit independently or in cooperation with the UHF transmitter 10 to output the response signal Sres including position information indicating whether the electronic key 1 is located in the first region RA, outside the first region RA in the second region RB, or outside the second region RB based on the electric field strength of the response request signal Sreq received by the electronic key 1 and the first threshold value th1 and the second threshold value th2.

Figure 3:
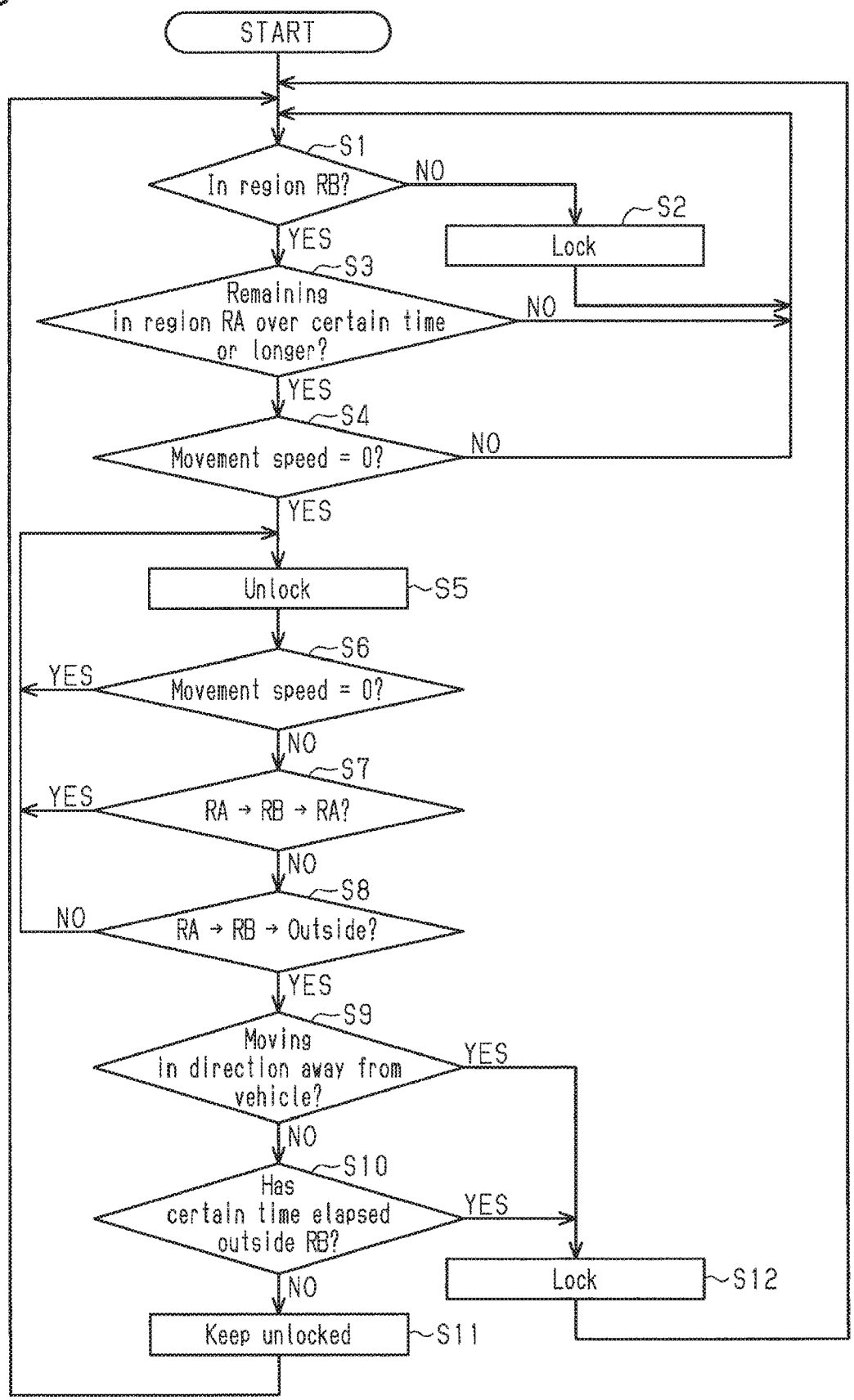
FIG. 3 is a flowchart illustrating the operation of an onboard controller.

In the same manner, the onboard controller 3 can include one or more memories that store a first fixed time length and a second fixed time length and one or more processors that execute the method of FIG. 3 including timer functions of S3 and S10.

The above embodiment may be modified as described below.

If the onboard controller 3 detects movement of the electronic key carrier, that is, movement of the electronic key 1 based on a response signal from the electronic key 1, the onboard controller 3 may increase the transmission output of the LF signal (response request signal Sreq) from the vehicle exterior LF transmitter 5 to enlarge the first region RA and the second region RB. Such a configuration allows the position of the electronic key 1 to be stably detected.

If the onboard controller 3 does not detect movement of the electronic key 1, the onboard controller 3 may decrease the transmission output of the LF signal (response request signal Sreq) from the vehicle exterior LF transmitter 5. Such a configuration reduces the power consumption of the onboard device 2.

The number of threshold values used to determine the electric field strength of the LF signal (response request signal Sreq) transmitted from the vehicle exterior LF transmitter 5 is not limited to two and may be three or more. The increase in the number of threshold values increases the accuracy and/or correctness for determining the position and movement of the electronic key 1.

It will be apparent to those skilled in the art that the present invention may be embodied in other specific forms without departing from the technical spirit thereof. For example, some of the components described in the embodiment (or one or more aspects thereof) may be omitted, or some of the components may be combined. The scope of the invention should be determined with reference to the appended claims along with the full scope of equivalents to which the appended claims are entitled.

DESCRIPTION OF REFERENCE CHARACTERS 1) electronic key; 2) onboard device; 3) onboard controller; 9) electronic key controller (response signal generation unit, threshold value setting unit); 12) position sensor; Sreq) response request signal; Sres) response signal; th1) first threshold value; th2) second threshold value; RA) first region; RB) second region

The invention claimed is:

1. A vehicle door lock device comprising:
a door lock configured to switch a door of a vehicle between a lock state and an unlock state;
an electronic key that transmits a response signal upon receipt of a response request signal; and
an onboard device installed in the vehicle, wherein the onboard device transmits the response request signal out of the vehicle and drives the door lock upon receipt of the response signal, wherein
the electronic key includes
a threshold value setting unit that stores a first threshold value setting a periphery of a first region generated by the response request signal and having a strong electric field strength and a second threshold value setting a periphery of a second region around the first region and having a weaker electric field strength than the first region, and
a response signal generation unit that outputs the response signal including position information indicating whether the electronic key is located in the first region, outside the first region and in the second region, or outside the second region based on an electric field strength detected by the electronic key and the first threshold value and the second threshold value, and
the onboard device includes an onboard controller that, upon receipt of the response signal, switches the door to the unlock state if the electronic key is remaining in the first region for a first fixed time length or longer and switches the door to the lock state if the electronic key is remaining outside the second region for a second fixed time length or longer.

2. The vehicle door lock device according to claim 1, comprising a position sensor that detects a position of the electronic key and movement information including movement speed and movement direction of the electronic key, wherein the response signal generation unit is configured to output the movement information by including the movement information in the response signal, and the onboard controller is configured to switch the door to the unlock state, based on the movement information, if the electronic key is remaining still in the first region over the first fixed time length or longer.

3. The vehicle door lock device according to claim 2, wherein when the electronic key is moved from the second region to outside the second region, the onboard controller is configured to switch the door to the lock state, based on the movement information, only if the electronic key is moved away from the vehicle.

4. The vehicle door lock device according to claim 2, wherein the onboard controller is configured to keep the door unlocked, based on the movement information, if the electronic key is moved from the first region to the second region and then to the first region.

5. The vehicle door lock device according to claim 1, wherein the onboard device includes a plurality of transmitters placed in proximity to the door of the vehicle and in proximity to a trunk lid to transmit the response request signal, and the first threshold value and the second threshold value are set so that the first region extends around each of the transmitters and the second region extends around the first regions and rearward from a side of the vehicle.

* * * * *